United States Patent Office 3,137,591
Patented June 16, 1964

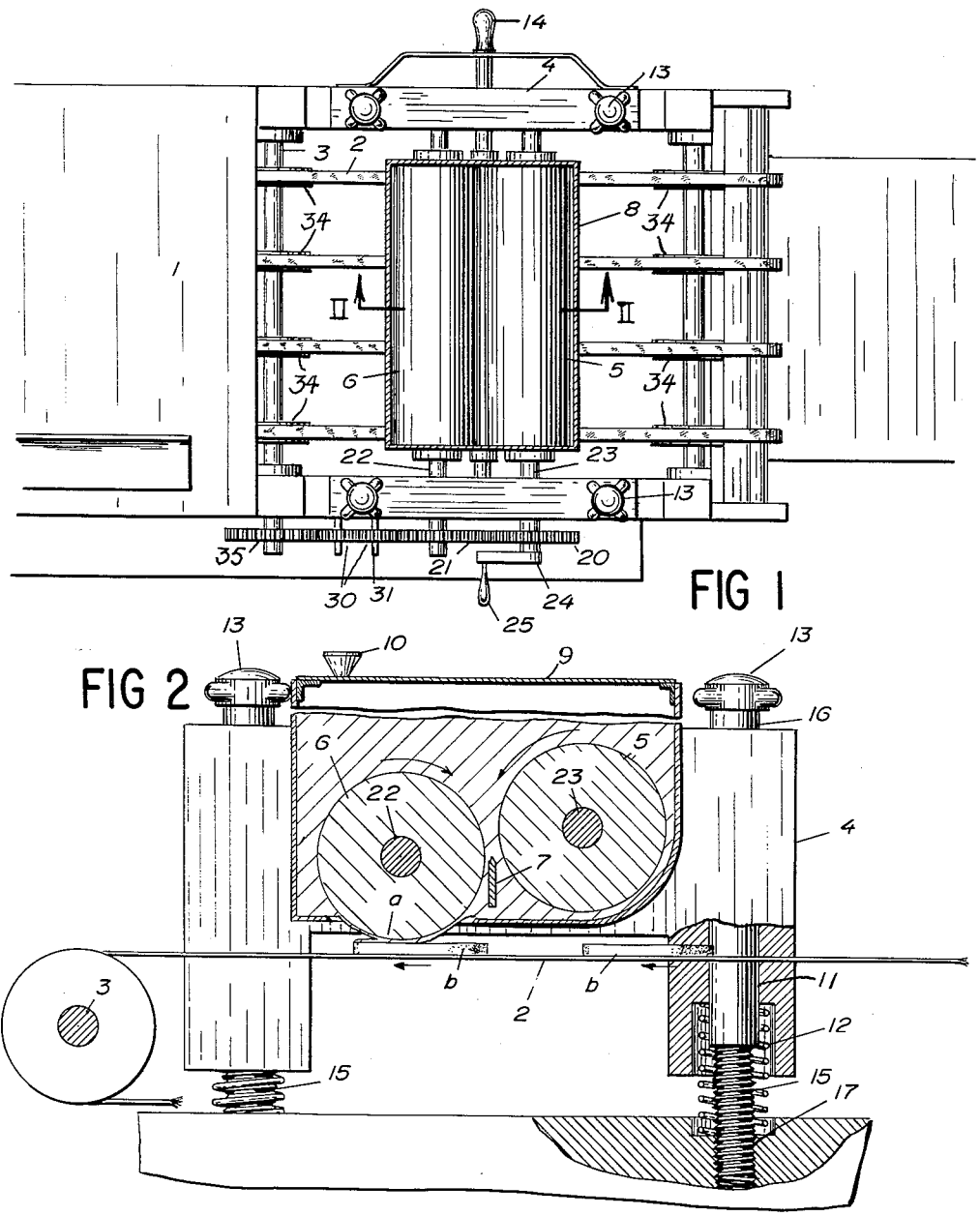

3,137,591
DEVICE FOR APPLYING BY MEANS OF TWO ROLLERS A PASTY MASS IN A UNIFORM LAYER ON SLICES OF BREAD OR THE LIKE
Josephus Alphonsus Antonius Schoutissen, Trambrugweg 8, Helmond, Netherlands
Filed May 6, 1960, Ser. No. 27,404
3 Claims. (Cl. 118—13)

The invention relates to a device for applying by means of two rollers a pasty mass, e.g. butter, in a uniform layer on slices of bread or the like.

In a known device the rollers project for some distance from the box containing the pasty mass, said box being mounted on one side of a conveyor for the slices of bread. It is impossible to work efficiently with the known device, since loss of butter is difficult to prevent. Further applying a presser plate is necessary for keeping the stock of butter in contact with the rollers.

Besides there is a known device for covering slices of bread, which device uses three rollers.

The object of the invention is to provide a device of the kind mentioned without the above disadvantages.

The device according to the invention comprises an endless conveyor belt mounted in a frame serving for supplying slices of bread, and above said conveyor belt a box for receiving the pasty mass, the rollers being applied near the bottom of said box and at right angles to the direction of movement of the conveyor belt, one of said rollers projecting partly through a slot-shaped aperture in the bottom of the box and an adjustable knife for determining the thickness of the layer of the paste to be delivered being placed on the bottom between the rollers.

Finally it was known to apply by means of one single roller a pasty mass on things, such as biscuits. The box which contains the mass, can be heated in such a way that said mass may always be pasty when the roller has to carry the mass. There is no need for a heating in the device according to the present invention. For hard butter the only measure is to cut it into strips.

The invention is combination of means known already in devices of a different nature, but which combination provides a device coming up to all requirements to be made in practice. In order to fit the device to various thickness of slices of bead and to adjust as accurately as possible the layer to be applied the box for receiving the pasty mass is adjustable with regard to the frame.

With the above and other objects in view which will become apparent from the detailed description below of a preferred form of the invention and shown in the drawings, in which:

FIG. 1 shows a top view of a device according to the invention,

FIG. 2 shows a cross-section taken on the line II—II of FIG. 1.

In the example shown the frame of the device is partly closed at its upper side by a sloping plate 1 on which slices of bread can be supplied to the device. In the example shown the conveyor means comprises a number of ropes 2 lead around rope pulleys 34. Said rope pulleys are adjustable transversely in order to adapt the conveying surface to the product to be treated. In the drawing one of the axles for the rope pulleys has the reference numeral 3. The frame carries side members 4 comprising the box for receiving the pasty mass. FIG. 2 shows a section of said box. The interior of the box 8 comprises two rollers 5 and 6 driven in opposite direction by means of the driving gear of the conveying means 2. An adjustable knife 7 is mounted between the rollers 5 and 6, said knife permitting the thickness of the layer to be adjusted. The roller 6, the applying roller, projects partly to the outside through a slot-shaped aperture in the bottom of the box 8. The box 8 is closed at its upper side by a cover 9, which cover can be pulled upwards by means of a knob 10.

The side members 4 are provided with a bore 11 having at its lower side a chamber 12. Said chamber encloses a spring 15. The side members 4 placed at both sides of the box 8 constitute a frame which is adjustable with respect to the conveying means 2. This means that the rollers are adjustable with respect to the said conveying means. Naturally this applies especially to the applying roller 6. In this way the device can treat slices of bread having different thicknesses.

On roller 6 a layer of butter *a* is supplied to the slices of bread *b* which by means of conveyor belt 2 are transported in the direction of the arrow. From the layer of butter *a* on roller 6 only such portion withdrawn as corresponds with the contour of a slice of bread so that after a slice *b* has passed the roller 6 a portion of butter exactly in accordance with the contour of a slice of bread *b* has been withdrawn.

The frame with the butter reservoir 8 is supported by the machine frame as indicated in FIGURE 2. Bolts 16 have heads 13 which rest on the frame for the butter reservoir and at its lower side the bolts 16 are provided with a screw thread which can be screwed into a threaded hole 17 of the machine frame. A spring 15 is located in chamber 12.

The butter reservoir is floatingly hung on the springs 15. Actually on both sides of the machine two springs 15 are provided and correspondingly also two bolts 16. So by tightening the bolts 16 the frame with the butter reservoir can be lowered, but always contrary to the tension of the springs 15. In such manner one can adjust the position of roller 6 with respect to a slice of bread *b* whereas the thickness of the layer of butter on the roller 6 is adjusted by the knife 7. Therefore, when the layer of butter *a* on the roller 6 has been adjusted thin, said layer of butter just touches a slice of bread by adjusting the frame for the butter reservoir.

The butter should not be thin fluid but slightly pasty. When the butter is hard as for example in winter, preheating it is not necessary but in such case it is recommended to cut the butter into small lumps and thereafter introduce them into the butter reservoir.

As indicated above, the two rollers 5 and 6 are driven in opposite directions by the following means. Fixed to the shaft 23 of the roller 5 is a gear 20 which may be rotated by the crank 24 and the handle 25. The gear 20 meshes with a gear 21 fixed to the shaft 22 of the roller 6 and two idler gears 30 mounted upon stud shafts 31 are driven by the gear 21 and such idler gears drive the gear 35 fixed to the shaft 3 of the tapes 2.

By adjusting the four operating knobs 13 of the rods 16, the box 8 comprising the rollers 5 and 6 can be moved to or from the conveying means 2 in order to obtain a given pressure between the bread to be treated and the paste to be supplied by the applying roller 6. A good adhesion of the paste, in the present case e.g. butter to the bread, requires a certain pressure and said pressure can be adjusted in the way described. The pressure is elastic by the fact that the side members 4 rest on springs 15 in the chambers 12.

It is imaginable that the side members 4 and the frame of the machine form one solid body. In that case the conveying means could be constructed so as to be elastically adjustable, but this is less efficient. Or the ropes 2 could be replaced by a conveyor belt.

The adjustment of the scraper knife 7 can be effected from the outside by means of a lever 14.

I claim:

1. A device for applying a pasty mass such as butter in a uniform layer on slices of bread or the like comprising a frame, means mounted in said frame for feeding slices of bread or the like, a reservoir for a pasty mass also mounted in said frame above said feeding means, said reservoir having a slot-shaped aperture in the bottom thereof, a solid applying roller mounted transversely to said feeding means in said reservoir projecting partly through said aperture and contacting said slices of bread and the pasty mass in said reservoir, a second roller mounted transversely to said feeding means in said reservoir for supplying paste to said applying roller, means for rotating said rollers in opposite directions and a knife mounted between said rollers for determining the thickness of the paste supplied to said applying roller.

2. A device as set forth in claim 1 wherein an endless conveyor belt constitutes the feeding means.

3. A device as set forth in claim 1 wherein said reservoir is adjustable in said frame.

References Cited in the file of this patent

UNITED STATES PATENTS

| | | |
|---|---|---|
| 1,816,535 | Joachimson | July 28, 1931 |
| 1,971,087 | Werner | Aug. 21, 1934 |
| 2,182,068 | Clark | Dec. 5, 1939 |
| 2,876,039 | Vogdt | Mar. 3, 1959 |
| 3,000,760 | Greiller | Sept. 19, 1961 |

FOREIGN PATENTS

| | | |
|---|---|---|
| 555,922 | Germany | Nov. 22, 1932 |